United States Patent [19]

Sari

[11] 4,408,332
[45] Oct. 4, 1983

[54] ADAPTIVE SYSTEM IN A DIGITAL DATA RECEIVER PROVIDING COMPENSATION FOR AMPLITUDE AND PHASE DISTORTIONS INTRODUCED BY A DATA TRANSMISSION CHANNELS

[75] Inventor: Hikmet Sari, Alfortville, France

[73] Assignee: U.S. Philips Corporation, New York, N.Y.

[21] Appl. No.: 260,617

[22] Filed: May 5, 1981

[30] Foreign Application Priority Data

May 14, 1980 [FR] France ............... 80 10862

[51] Int. Cl.³ ............................. H03H 21/00
[52] U.S. Cl. ................................ 375/14; 375/99; 333/18; 329/50
[58] Field of Search .............. 375/11, 12, 13, 14, 375/51, 57, 58, 99, 101; 333/18, 28 R, 70 T; 364/724, 825, 514; 329/50

[56] References Cited

U.S. PATENT DOCUMENTS 4,035,735  7/1977  Akashi et al. ............... 375/12

OTHER PUBLICATIONS

H. Nussbaumer "Reducing the Acquisition Time in Automatic Equalizer" Oct. 1975, by IBM Technical Disclosure Bulletin pp. 1465-1479.

Mese & Giul, "On the Use of Smoothing Techniques for Digital Channel Equalzation" 4-7 Jun. 1978 by International Conference on Communication pp. 25.2.1-2.4.

Primary Examiner—Benedict V. Safourek
Assistant Examiner—Stephen Chin
Attorney, Agent, or Firm—James J. Cannon, Jr.

[57] ABSTRACT

An adaptive system in a digital data receiver providing compensation for amplitude and phase distortions introduced by the data transmission channel comprises, at the output of the transmission channel (1) which produces a signal vector $X_k$, a transversal filter (2) with N weighting coefficients, followed by a decision circuit (3). For the direct determination of the N coefficients, the system comprises a circuit (4) for estimating the autocorrelation matrix A of the vectors $X_k$, a circuit (5) for approximating the estimated matrix by a circulant matrix $R^e$, a circuit (6) for calculating a vector whose components are the eigenvalues of $R^e$, a circuit (7) for estimating a vector V which expresses the correlation between the output sigans of the channel (1) and the decision circuit (3), calculating circuits (8) and (9), and a circuit (10) for estimating a vector $C^R$ which represents an approximation of the vector of the N optimum weighting coefficients of the filter.

3 Claims, 10 Drawing Figures

FIG.1

FIG.2a $$A = \begin{bmatrix} E(X_k^2) & E(X_k \cdot X_{k-1}) & \text{------} & E(X_k \cdot X_{k-N+1}) \\ E(X_{k-1} \cdot X_k) & E(X_{k-1}^2) & \text{------} & E(X_{k-1} \cdot X_{k-N+1}) \\ E(X_{k-2} \cdot X_k) & E(X_{k-2} \cdot X_{k-1}) & \text{------} & E(X_{k-2} \cdot X_{k-N+1}) \\ \vdots & \vdots & & \vdots \\ E(X_{k-N+3} \cdot X_k) & E(X_{k-N+3} \cdot X_{k-1}) & \text{-----} & E(X_{k-N+3} \cdot X_{k-N+1}) \\ E(X_{k-N+2} \cdot X_k) & E(X_{k-N+2} \cdot X_{k-1}) & \text{-----} & E(X_{k-N+2} \cdot X_{k-N+1}) \\ E(X_{k-N+1} \cdot X_k) & E(X_{k-N+1} \cdot X_{k-1}) & \text{------} & E(X_{k-N+1}^2) \end{bmatrix}$$

$$A = \begin{bmatrix} a_0 & a_1 & a_2 & \cdots & & \cdots & a_{N-2} & a_{N-1} \\ a_1 & a_0 & a_1 & & & & & a_{N-2} \\ a_2 & a_1 & a_0 & & & & & \vdots \\ \vdots & & & & & & & \\ & & & & & & & a_2 \\ a_{N-2} & & & & & & & a_1 \\ a_{N-1} & a_{N-2} & \cdots & & & \cdots & a_2 & a_1 & a_0 \end{bmatrix}$$

FIG.2b $$A = \begin{bmatrix} a_0 & a_1 & a_2 & \cdots & a_{l-2} & a_{l-1} & 0 & \cdots & & 0 \\ a_1 & a_0 & a_1 & & & a_{l-2} & a_{l-1} & & & \vdots \\ a_2 & a_1 & a_0 & & & & & & & 0 \\ \vdots & & & & & & & & & a_{l-1} \\ & & & & & & & & & a_{l-2} \\ a_{l-2} & & & & & & & & & \\ a_{l-1} & & & & & & & & & \\ 0 & & & & & & & & & a_1 \\ \vdots & & & & & & & & a_1 & a_0 \\ 0 & & & & & & & & & \end{bmatrix}$$

FIG.2c $$R = \begin{bmatrix} a_0 & a_1 & a_2 & \cdots & a_{s-1} & a_s & a_s & a_{s-1} & \cdots & a_2 & a_1 \\ a_1 & a_0 & a_1 & \cdots & & & & & & & a_2 \\ a_2 & a_1 & a_0 & \cdots & & & & & & & \vdots \\ \vdots & & & & & & & & & & a_{s-1} \\ a_{s-1} & & & & & & & & & & a_s \\ a_s & & & & & & & & & & a_s \\ a_s & & & & & & & & & & a_{s-1} \\ a_{s-1} & & & & & & & & & & \vdots \\ \vdots & & & & & & & & & & \\ a_2 & & & & & & & & & & a_1 \\ a_1 & a_2 & \cdots & a_{s-1} & a_s & a_s & a_{s-1} & \cdots & a_1 & a_0 \end{bmatrix}$$

FIG.3a

$$R = \begin{bmatrix} a_0 & a_1 & a_2 & \cdots & a_{l-1} & 0 & \cdots & 0 & a_{l-1} & \cdots & a_2 & a_1 \\ a_1 & a_0 & & & & & & & & & & a_2 \\ a_2 & & & & & & & & & & & \vdots \\ \vdots & & & & & & & & & & & a_{l-1} \\ a_{l-1} & & & & & & & & & & & 0 \\ 0 & & & & & & & & & & & \vdots \\ \vdots & & & & & & & & & & & 0 \\ 0 & & & & & & & & & & & a_{l-1} \\ a_{l-1} & & & & & & & & & & & \vdots \\ \vdots & & & & & & & & & & & a_1 \\ a_2 & & & & & & & & & & & a_0 \\ a_1 & a_2 & \cdots & a_{l-1} & 0 & \cdots & 0 & a_{l-1} & \cdots & a_1 & a_0 \end{bmatrix}$$

FIG.3b

$$R^{-1}A = \begin{bmatrix} & 0 & \\ \hline & I & \\ \hline & 0 & \end{bmatrix} \begin{matrix} \updownarrow l-1 \\ \\ \updownarrow l-1 \end{matrix}$$

$\underset{l-1}{\leftrightarrow} \quad \underset{l-1}{\leftrightarrow}$

ADAPTIVE SYSTEM IN A DIGITAL DATA RECEIVER PROVIDING COMPENSATION FOR AMPLITUDE AND PHASE DISTORTIONS INTRODUCED BY A DATA TRANSMISSION CHANNELS

BACKGROUND OF THE INVENTION

1. Field of the Invention

The invention relates to an adaptive system in a digital data receiver providing compensation for amplitude and phase distortions introduced by a data transmission channel.

2. Description of the Prior Art

Figure 1:
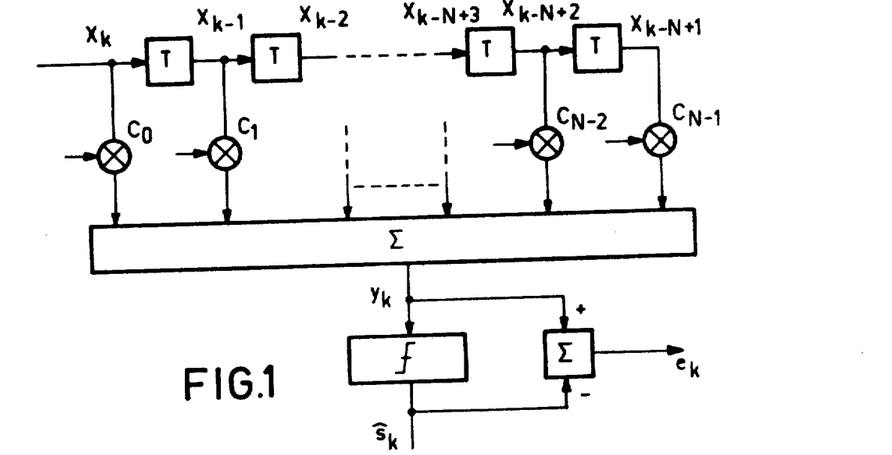
FIG. 1 shows a non-recursive transversal filter of a known type, with N weighting coefficients.

It is known fact that at high transmission rates, a correct restitution, at the output of the transmission channel, of the signals applied to its input is no longer possible without the provision of a compensation circuit, designated equalizer, which is often formed by a non-recursive transversal filter, i.e. by a circuit which is capable of correcting the response of a transmission channel on the basis of a finite and weighted sum of partial responses available on the consecutive taps of an impedance network formed by delay lines. An equalizer of a conventional type having N weighting coefficients is shown in FIG. 1 (the article by J. G. Proakis and J. H. Miller, published on pages 484 to 497 in the periodical IEEE Transactions on Information Theory, Vol. IT-15, No. 4, July 1969 gives a description of such an equalizer having seven coefficients). Since the impulse response of the channel is not known and furthermore tends to evolve in the time, the equalizer must be adaptive, that is to say it must be capable of adjusting its weighting coefficients to the optimum values at the beginning of the transmission (this is commonly referred to as the acquisition or training phase of the equalizer), and of following thereafter any variations of the channel during the actual transmission phase.

Such an adjustment of the coefficients of the equalizer is generally obtained by iterative methods, such as the stochastic gradient method (actually, the circuits by means of which they can be implemented are relatively simple and are well suited to follow the slow variations of the transmission channel), but which inevitably meet the following obstacles: if the step used in the iterative method has too high a value the receiving system may become instable, while a small step size corresponds with a very slow convergence speed.

These two disadvantages can be avoided by using the direct resolution of the Wiener-Hopf equation, which gives theoretically the optimum coefficients of the adaptive equalizer (this resolution is described in the article "Non-iterative automatic equalization" published by P. Butler and A. Cantoni, June 1975, pages 621 to 633 of the periodical IEEE Transactions on Communications, Vol. COM-23, No. 6), but its complexity makes it actually very difficult to apply this direct method.

SUMMARY OF THE INVENTION

The invention has for its object to provide an adaptive system for receiving digital data in which the direct determination of the values of the coefficients of the equalizer is coupled with a relatively simple structure.

The invention therefore relates to a receiving system as said forth in the preamble and comprising an adaptive equalizing circuit receiving a signal vector $X_k$ from the data transmission channel output and producing an output signal $y_k$, and a decision circuit receiving this output signal $y_k$ and producing an estimation $\hat{s}_{k-d}$ of each one of the digital data $s_{k-d}$ applied to the data transmission channel input, characterized in that the adaptive equalizing circuit is a non-recursive transversal filter having N adjustable weighting coefficients and the adaptive system comprises for the direct determination of these coefficients:

a first circuit for determining, in an estimated matrix $A^e$ of the square signal autocorrelation matrix $A = E(X_k \cdot X_k^{TR})$ where E is the expectation operator and $X_k^{TR}$ is the transpose of $X_k$, the $(N/2+1)$ first elements $(a_0, a_1, a_2, \ldots a_{N/2})$ of the first row if N is even, or the $(N+1)/2$ first elements $(a_0, a_1, a_2, \ldots a_{(N-1)/2})$ of the first row if N is odd, over an interval equal to a predetermined number M of data symbol periods of duration T on the basis of the relation $$A^e = \frac{1}{M} \sum_{i=1}^{i=M} X_i \cdot X_i^{TR},$$

a second circuit connected to said first circuit for forming a vector $U = (r_0, r_1, r_2, \ldots r_{N-2}, r_{N-1})$ in which $r_i = a_i$ for every i not exceeding N/2 if N is even, or not exceeding $(N-1)/2$ if N is odd, and $r_i = a_{N-i}$ for every i exceeding said limits, a third circuit connected to said second circuit for forming a vector $\Lambda = (\lambda_0, \lambda_1, \lambda_2, \ldots, \lambda_{N-1})$, whose components are the eigenvalues of a circulant matrix having said vector U as a first row, with the aid of the relation $$\Lambda = \sqrt{N} \cdot P \cdot U^{TR}$$

where $U^{TR}$ is the transpose of U and P is the unitary matrix of the order N defined by $$P = ||P_{f,g}|| (f, g = 0, 1, 2, \ldots, N-2, N-1)$$

and $$P_{f,g} = \frac{1}{\sqrt{N}} \exp [j \, 2\pi \, fg/N],$$

a fourth circuit connected to the data transmission channel output and the decision circuit output for determining an estimation $V^e$ of the signal correlation vector $V = E(X_k \hat{s}_{k-d})$ in accordance with the relation $$V^e = \frac{1}{M} \sum_{i=1}^{i=M} X_i \cdot \hat{s}_{i-d}$$

a fifth circuit connected to said fourth circuit for multiplying said estimated vector $V^e$ by the complex conjugate $P^{cc}$ of said unitary matrix P, a sixth circuit connected to said fifth and third circuits for dividing the vector $Q = P^{cc} \cdot V^e$ at the output of said fifth circuit by said vector $\Lambda$ at the output of said third circuit on a term-by-term basis so that the resulting vector $F = (f_0, f_1, f_2, \ldots f_{N-1}) = Q/\Lambda$ has components $f_i = q_i/\lambda_i$ for every i not exceeding $N-1$, a seventh circuit connected to said sixth circuit for multiplying said vector F by said unitary matrix P, the resulting vector $C^R = P.F$ constituting an approximation of the vector of the N optimum weighting coefficients of said transversal filter and being applied to said transversal filter for adjusting the weighting coefficients.

In a second embodiment, the system further comprises:

- an eighth circuit connected to the data transmission channel output for multiplying said signal vector $X_k$ by said unitary matrix P, the resulting signal vector $Z_k = P.X_k$ being applied to said transversal filter input,
- a ninth circuit interconnecting said seventh circuit and said transversal filter for multiplying said vector $C^R$ at the output of said seventh circuit by said matrix $P^{cc}$, the resulting vector $D^R = P^{cc}.C^R$ constituting an approximation of the N optimum weighting coefficients of said transversal filter when this filter receives said signal vector $Z_k$, and being applied to said filter for adjusting the weighting coefficients.

The two structures thus defined make it possible, but for an approximation the justification of which will be given hereinafter, to obtain in a direct and rapid manner, avoiding the complexity of implementing the above-mentioned direct method, a set of quasi-optimum weighting coefficients for the adaptive transversal filter, and that without any of the convergence and stability problems encountered when iterative methods are employed.

BRIEF DESCRIPTION OF THE DRAWINGS

Further details of the invention will now be described in greater detail with reference to the accompanying drawing in which:

FIG. 3a shows, for the case N is odd and equal to 2S+1, the circulant matrix R selected in accordance with FIG. 2b to constitute the approximation of said matrix A, and FIG. 3b shows a simplified structure of said matrix R taking account of the length l of the sampled response of the data transmission channel;

FIG. 4 shows which partition may be effected in the structure of the matrix product of the inverse of said matrix R by said matrix A;

DESCRIPTION OF THE PREFERRED EMBODIMENTS

To describe the two embodiments of the system in accordance with the invention, which embodiments will be specified hereinafter, it is assumed that the transmitter system preceding the transmission channel transmits a stream of non-correlated binary data $S_k$, equal to $\pm 1$, that the impulse response of the transmission channel, is h(t), and that receiver is in perfect synchronization with the transmitter.

If x(t) is the signal received and samples at a rate of 1/T (T being the duration of a symbol period and if the sample at an instant $t_0 + kT$ is defined by the relation:

$$x_k = \left( \sum_{j=0}^{j=l-1} h_j \cdot s_{k-j} \right) + n_k \quad (1)$$

in which l defines the length of the sampled response of the transmission channel and $n_k$ the noise at the instant $t_0 + kT$, it is then possible to define for an adaptive equalizer with N weighting coefficients $C_0, C_1, C_2, \ldots, C_{N-2}, C_{N-1}$ (see FIG. 1), the following column vectors, which for the sake of convenience are written in the equivalent form of the transposed row vectors (TR indicating the transposition operator):

$$X_k = [x_k \ x_{k-1}, \ldots, x_{k-N+2} \ x_{k-N+1}]^{TR} \quad (2)$$

and $$C = [C_0 \ C_1 \ C_2 \ldots, C_{N-2} \ C_{N-1}]^{TR} \quad (3)$$

By definition, the output signal of the equalizer is, prior to decision:

$$y_k = C^{TR}.X_k \quad (4)$$

or, which is the same:

$$y_k = X_k^{TR}.C \quad (4 \text{ bis})$$

and the difference, at $t_0 + kT$, between $y_k$ and the corresponding digital data $\hat{s}_{k-d}$ (taking account of the fact that the decision concerning each symbol is produced with a delay d.T with respect to the transmission of this symbol, and that said delay d.T may be optimized to minimize the mean square error, as described in, for example, the above-cited article by Butler and Cantoni, page 622, § III, A, lines 5-6 and page 624, § C) is given by the relation:

$$e_k = C^{TR}.X_k - \hat{s}_{k-d} \quad (5)$$

In the equalizer art, there are different criteria to reduce said difference between the exact form of the transmitted signals and the estimated form they have at the output of the equalizer. Here one of the most frequently used criteria will be considered, namely the criterion of minimizing the mean square error, and we shall try to choose the vector C in order to minimize the mean value of $e_k^2$ (It is assumed that all decisions are correct, i.e. $\hat{s}_{k-d} = s_{k-d}$ for every value of k).

Simultaneously using the two equivalent relations (4) and (4 bis) gives:

$$e_k^2 = (C^{TR} \cdot X_k - \hat{s}_{k-d})(X_k^{TR} \cdot C - \hat{s}_{k-d}) \quad (6)$$

-continued $$= C^{TR} \cdot X_k \cdot X_k^{TR} \cdot C - 2C^{TR} \cdot X_k \cdot \hat{s}_{k-d} + 1$$

The average value of $e_k^2$ is taken, i.e.:

$$E(e_k^2) = C^{TR}.A.C - 2C^{TR}.V + 1 \tag{7}$$

in which equation, E being the expectation operator, A and V are given by:

$$A = E(X_k.X_k^{TR}) \tag{8}$$

and $$V = E(X_k.s_{k-d}) \tag{9}$$

The relation (7) furnishes the mean square error for a given vector C, which error can be minimized as a function of C, for which it is necessary that:

$$\text{gradient } (C) = G(C) = \frac{\partial E}{\partial C} = 2(A \cdot C - V) = 0$$

G(C) is zero if AC = V, that is to say if:

$$C = A^{-1}.V \tag{10}$$

This vector C is the optimum vector searched for, which will be designated $C^A$ in the further course of the description, and can be obtained, as described above, by the iterative methods mentioned in the foregoing or by the direct resolution of the equation:

$$C^A = A^{-1}.V \tag{11}$$

This resolution is, however, difficult for it means that the matrix A must be inverted, which means that a very large number of operations must be performed.

Figure 2A:
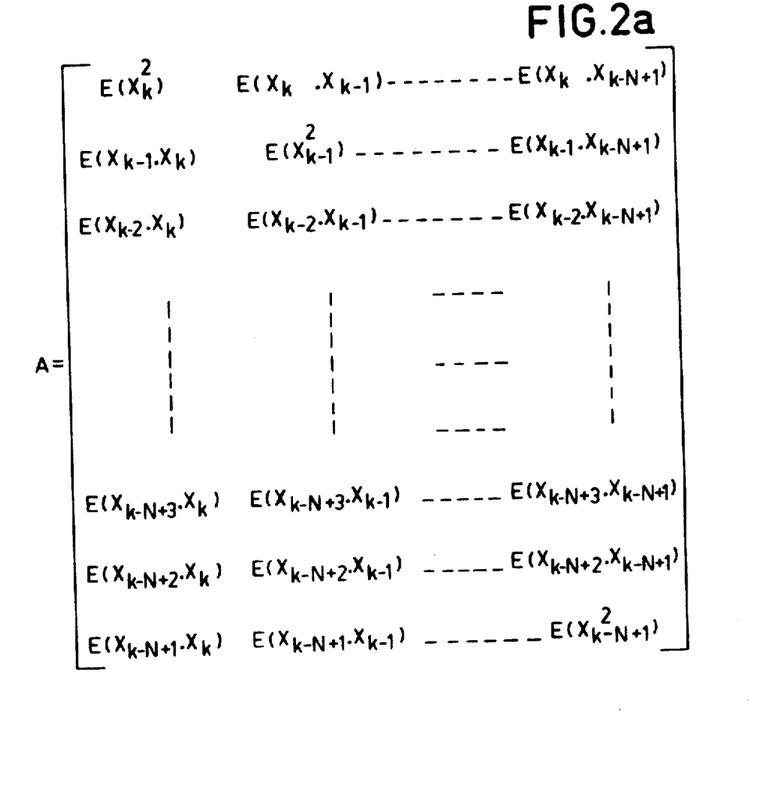
FIG. 2a shows the signal autocorrelation matrix A of N consecutive samples of the random process x(t) to which the consecutive output signal vectors $X_k$ of the data transmission channel correspond.
Figure 2B:
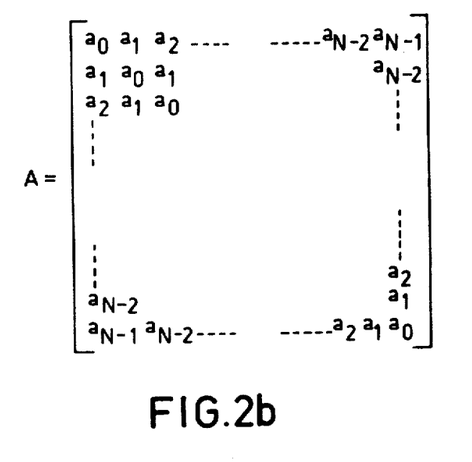
FIG. 2b shows a much simpler structure of said matrix A taking account of the fact that x(t) is a random process of the stationary type.

In accordance with the invention, this resolution is avoided by performing a determination of an approximate vector, denoted $C^R$, of the optimum vector $C^A$. The determination of $C^R$ is based on the following considerations; the matrix A defined by the relation (8) and shown in FIG. 2a is the autocorrelation matrix of N consecutive samples of the random process x(t). This process being of the stationary type, all the terms $E(X_i^2)$ are equal; for the same reason, all the terms $E(X_i.X_j)$ for which $|i-j|$ is constant, are also equal. This results in that the matrix A is symmetrical, that its diagonal terms are equal, and that it can therefore be presented in the form defined in FIG. 2b. On the other hand, as l is the length of the sampled response of the channel all the terms $E(X_i.X_j)$ in which the difference between i and j is equal to or higher than l are zero, as they correspond to the signals received between which there is no longer any correlation. The matrix A takes therefore ultimately the simplified form shown in FIG. 2c.

Figure 2C:
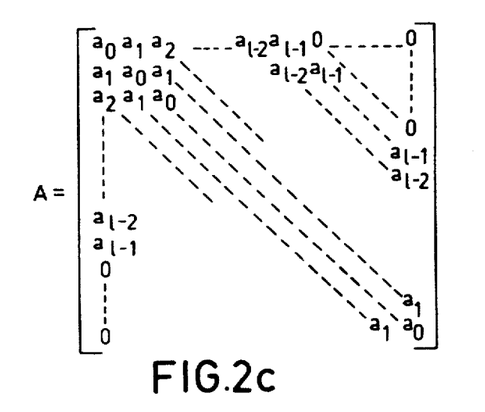
FIG. 2c shows a still simpler structure of said matrix A taking account of the length of the sampled response of the channel.

If the number N of the coefficients of the equalizer is chosen large with respect to the length l, this matrix A is quasi-diagonal (as is also its inverse matrix $A^{-1}$ but for marginal effects) and it is possible to define therefrom an approximation which is a circulant matrix R constructed as follows. If $(a_0, a_1, a_2, \ldots a_{N-2}, a_{N-1})$ is the first row of A and $(r_0, r_1, r_2, \ldots r_{N-2}, r_{N-1})$ is the first row of R, $r_i = a_i$ for every i which is lower than or equal to N/2 if N is even, or to (N−1)/2 if N is odd, and $r_i = a_{N-i}$ for every i which is higher than the above limits.

The following rows of R, of the order 2 to N, comprise the same terms as the first row of R, but after cyclic permutation of these terms to the right: after a cyclic permutation to the right for the second row with respect to the first row, after a new cyclic permutation to the right for the third row with respect to the second row (i.e. in fact two consecutive cyclic permutations with respect to the first row of R), and thus onwards to the $N^{th}$ row of R, derived from the first row by N−1 cyclic permutations to the right. For the case that N is odd and equal to (2S+1), the matrix R thus obtained is shown in FIG. 3a. Just like the matrix A, this matrix R may take the simplified form which is shown in FIG. 3b and which corresponds to the simplified form of A shown in FIG. 2c. If this circulant matrix R is in essence a good approximation of the matrix A it is possible, in accordance with the equation $C^A = A^{-1}V$, to define a vector $C^R = R^{-1}V$ which is also a good approximation of the optimum vector $C^A$ searched for.

To demonstrate that this approximation of $C^A$ by $C^R$ is in essence valid, the relations which define $C^A$, the optimum vector, and $C^R$, the approximated vector, are considered:

$$C^A = A^{-1}.V \tag{11}$$

$$C^R = R^{-1}.V \tag{12}$$

The first relation gives, by multiplication to the left:

$$V = A.C^A$$

and using the second relation gives:

$$C^R = R^{-1}.A.C^A \tag{13}$$

The calculation of $R^{-1}.A$ shows that this matrix product has the form shown in FIG. 4, and comprises:
- a Kernel identical to the identity matrix of the order N−2(l−1);
- above and below this identity matrix zero elements; and
- on either side of the columns including this identity matrix and these zero elements, 2(l−1) columns which comprise non-zero elements.

Taking account of this structure of the product $R^{-1}.A$ and the partition which has here been effected to show the particular character, if $C^A$ would have the following structure:

$$C^A = [\underbrace{0\,0\,\ldots\,0}_{l-1} \mid C_2^{TR} \mid \underbrace{0\,\ldots\,0\,0}_{l-1}]\, TR \tag{14}$$

the multiplication of $R^{-1}.A$ by $C^A$ would give:

$$C^R = (R^{-1}.A)C^A = [0\,0\,\ldots\,0 \mid C_2^{TR} \mid 0\,\ldots\,0\,0]^{TR} \tag{15}$$

i.e. $C^R = C^A$.

Actually, the relation (14) is not strictly satisfied. If $C^A$ is expressed as follows:

$$C^A = [C_1^{TR} \mid C_2^{TR} \mid C_3^{TR}]\, TR \tag{16}$$

$$C^A = A^{-1} \cdot V$$

and if good note is taken of the fact that, because of the limited length l of the sampled response of the transmission channel, on the one hand only the l central components of the vector V are not zero (the N−1 other components situated on either side being zero because they correspond to the signals received between which there is no correlation), and on the other hand that the matrix $A^{-1}$ is quasi-diagonal but for marginal effects, it is then possible to confirm that the components of the vectors $C_1$ and $C_3$ may be disregarded. In essence, the structure of $C^A$ is therefore very near to the structure defined by the relation (14), which proves that the choice of R as described in the foregoing allows the determination of a vector $C^R$ which approaches the vector $C^A$ in a satisfactory way. As the two matrices A and R, which have dimensions N×N, differ only by the elements situated in the two upper right triangles and lower left triangles, the approximation of A by R and consequently of $C^A$ by $C^R$ is better according as the number N is greater; $C^R$ is even asymptotically equivalent to $C^A$. Finally, the mathematical study of the matrix R shows that it is always defined and that its inverse matrix always exists, which proves the existence and the uniqueness of $C^R$.

By diagonalizing the matrix R it is possible to write equation (12) as follows:

$$C^R = R^{-1} \cdot V = P \cdot G^{-1} \cdot P^{cc} \cdot V \quad (17)$$

where:
  $G^{-1}$ = a diagonal matrix the diagonal elements of which are the inverse values of the eigenvalues $\lambda_0$, $\lambda_1, \lambda_2, \ldots \lambda_{n-2}, \lambda_{N-1}$ of the matrix R:
where:
  P = the symmetrical unitary matrix of the order N, which is known a priori as it is independent of R and common to all the circulant matrices, and whose columns are eigenvectors of the matrix R (this matrix P may be defined by:

$$P = ||P_{fg}|| \, (f, g = 0, 1, 2, \ldots, N-2, N-1)$$

and $$P_{fg} = \frac{1}{\sqrt{N}} \exp(j \, 2\pi \, fg/N)$$

and the multiplication of a vector by this matrix produces, but for the coefficient $$\frac{1}{\sqrt{N}},$$

the inverse Discrete Fourier Transform, or inverse DFT, of said vector);
and where:
  $P^{cc}$ = the complex conjugate matrix of P (this matrix $P^{cc}$ may also be defined by:

$$P^{cc} = ||P_{fg}|| \, (f, g = 0, 1, 2, \ldots, N-2, N-1)$$

and $$P_{fg} = \frac{1}{\sqrt{N}} \exp(-j \, 2\pi \, fg/N)$$

and the multiplication of a vector by $P^{cc}$ produces, but for the coefficient $$\frac{1}{\sqrt{N}},$$

the Discrete Fourier Transform, or DFT, of this vector).

Figure 5:
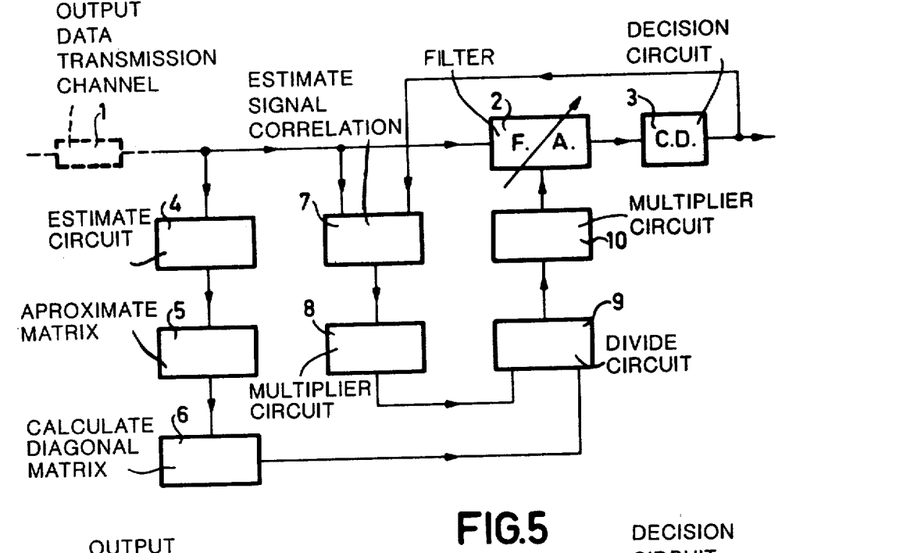
FIG. 5 shows a first embodiment of the receiving system in accordance with the invention.

It is possible to derive from the expression (17), a first structure of the digital data receiving system permitting to obtain the vector of the weighting coefficients searched for. This system, shown in FIG. 5, comprises first, at the output of a data transmission channel 1, a non-recursive adaptive filter 2 designated FA, having adjustable weighting coefficients, and receiving the output signal vector $X_k$ of the transmission channel. This filter 2 is followed by a decision circuit 3, designated CD, which derives from the output signal $y_k$ of the filter an estimation $\hat{s}_{k-d}$ of each of the digital data $s_{k-d}$ transmitted at the input of the channel (the system knows the transmitted digital data only during the acquisition or training phase and then the estimation $\hat{s}_{k-d}$ is always equal to the data $s_{k-d}$ itself). To determine the weighting coefficients of the filter 2 the system of FIG. 4 also comprises:

(A) a circuit 4 for estimating the square autocorrelation matrix A of the vector $X_k$, theoretically in accordance with the following relation:

$$\text{Estimation of } A = A^e = \frac{1}{M} \sum_{i=1}^{i=M} X_i \cdot X_i^{TR} \quad (18)$$

M being an integer which represents the number of symbol periods of duration T which are fixed by a clock circuit and define the interval over which the estimation of A is effected (in the embodiment described here, M was chosen equal to 400 and equal to 500, respectively, which both furnish good results, but the choice of this integer results anyway from a compromise between the accuracy of the calculations and the repetition rate of these calculations). It should be noted that the estimation of A does not mean the estimation of $N^2$ elements but simply, in the first row of the estimated matrix $A^e$ of A, the estimation over an interval equal to MT of the (N/2+1) first elements ($a_0, a_1, a_2, \ldots, a_{N/2}$) if N is even, or of the (N+1)/2 first elements ($a_0, a_1, a_2, \ldots a_{(N-1)/2}$) if N is odd. This important reduction in the number of elements to be estimated is very advantageous as regards the simplicity of the circuits.

(B) a circuit 5 for approximately the matrix $A^e$ by a circulant matrix $R^e$, this approximation of $A^e$ by $R^e$ being obtained by replacing the first row ($a_0^e, a_1^e, a_2^e, \ldots a_{N-2}^e, a_{N-1}^e$) of $A^e$ by a first row ($r_0^e, r_1^e, r_2^e, \ldots r_{N-2}^e, r_{N-1}^e$) in which $r_i^e = a_i^e$ for every i lower than or equal to N/2 if N is even, or to (N−1)/2 if N is odd, and $r_i^e = a_{N-i}^e$ for every i which is higher than these limits. As $R^e$ is circulant, the determination of its first row is sufficient to know the entire matrix and the approximation of $A^e$ by $R^e$ simply amounts to the formation of the vector $U = (r_0^e, r_1^e, r_2^e, \ldots r_{N-2}^e, r_{N-1}^e)$ in which $r_i^e = a_i^e$ for every i not exceeding N/2 if N is even, or not exceeding (N−1)/2 if N is odd, and $r_i^e = a_{N-i}^e$ for every i which is higher than these limits.

(C) a circuit 6 for calculating a diagonal matrix $G^e$ whose diagonal terms are the eigenvalues of the circulant matrix $R^e$, which circuit, taking account of the simplifications already effected sub (A) and (B), actually consists of a circuit for forming a vector $\Lambda^e$ of N eigenvalues $\lambda_0^e, \lambda_1^e, \lambda_2^e, \ldots \lambda_{N-2}^e, \lambda_{N-1}^e$ with the aid of the relation $A^e = \sqrt{N} \cdot P \cdot U^{TR}$, where $U^{TR}$ is the transpose of the vector U formed sub (B) and P is the unitary matrix which has already been defined.

(D) a circuit 7 for estimating the signal correlation vector $V = E(X_k \cdot \hat{s}_{k-d})$, where E indicates the estimation operator, in accordance with the following relation:

$$\text{Estimation of } V = V^e = \frac{1}{M} \sum_{i=1}^{i=M} X_i \cdot \hat{s}_{i-d} \quad (19)$$

(E) a multiplier circuit 8 for multiplying the vector $V^e$ thus obtained by the matrix $P^{cc}$, which is the complex conjugate matrix of the matrix P.

(F) a multiplier circuit for multiplying the product $P^{cc} \cdot V^E$ by the diagonal matrix $G^{e-1}$, which circuit is acutally formed, because of the simplifications already effected, by a circuit 9 which "divides" the vector $Q = P^{cc} \cdot V^E$ by the vector $\Lambda_e$, this division being effected term-by-term so that the components of the vector $F = (f_0, f_1, f_2, \ldots f_{N-2}, f_{N-1}) = Q/\Lambda^e$ are given by the expression $f_i = q_i / \lambda_i^e$, whatever the value of i.

(G) a multiplier circuit 10 for multiplying the vector F by the unitary matrix P, the vector thus obtained being an estimate of the vector $C^R$ constituting the desired approximation of the column vector $C^A$ of the N weighting coefficients of the transversal filter 2, which ensure an optimum equalization of the transmission channel 1.

A second structure of the system in accordance with the invention can be derived from the expression (17) obtained in the foregoing if a multiplication of the two members of this expression by $P^{cc}$ is effected. This results in that $$P^{cc} \cdot C^R = P^{cc} \cdot P \cdot G^{-1} \cdot P^{cc} \cdot V \quad (21)$$
$$= G^{-1} \cdot P^{cc} \cdot V$$
$$= G^{-1} \cdot P^{cc} \cdot E(X_k \cdot \hat{s}_{k-d})$$
$$= G^{-1} \cdot E(P^{cc} \cdot X_k \cdot \hat{s}_{k-d})$$
$$= G^{-1} \cdot E(Z_k^{cc} \cdot \hat{s}_{k-d})$$
$$D^R = G^{-1} \cdot W$$

where $$Z_k = P \cdot X_k; \ Z_k^{cc} = P^{cc} \cdot X_k; \ D^R = P^{cc} \cdot C^R \quad (22)$$

Figure 6A:
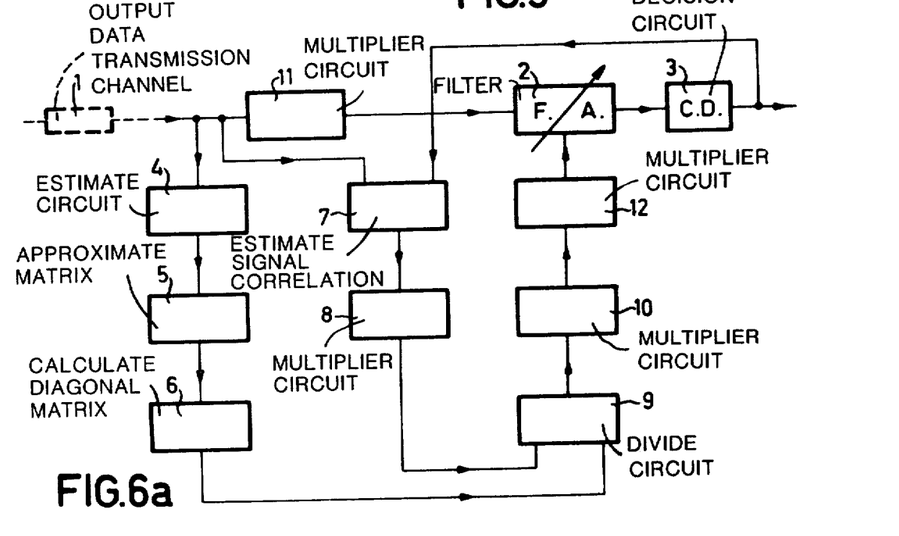
FIG. 6a and FIG. 6b show two variants of the structure of a second embodiment of the receiving system in accordance with the invention.

In FIG. 6a, this multiplication of expression (17) by $P^{cc}$ results, with respect to FIG. 5, in the appearance of two supplementary circuits 11 and 12. The circuit 11 ensures the multiplication of the output signal vector $X_k$ of the transmission channel 1 by the unitary matrix P in order to produce the novel signal vector $Z_k$, which is applied to the transversal filter 2, and the circuit 12 ensures the multiplication of the vector at the output of the circuit 10 by the matrix $P^{cc}$ in order to produce an estimate of the vector $D^R$ which constitutes an approximation of the vector of the N weighting coefficients of the adaptive filter 2 which, when said filter receives the signal $Z_k$, ensure an optimum equalization of the transmission channel.

FIG. 6a shows that the consecutive circuits 10 and 12 ensure a multiplication by P and a multiplication by $P^{cc}$, respectively. As the matrix P is unitary and symmetrical it is clear that $P \cdot P^{cc} = P^{cc} \cdot P = I$, and it is therefore in actual practice no longer necessary to provide the two circuits 10 and 12 whose effects cancel each other, and so the simplified structure of FIG. 6b can be proposed.

Figure 6B:
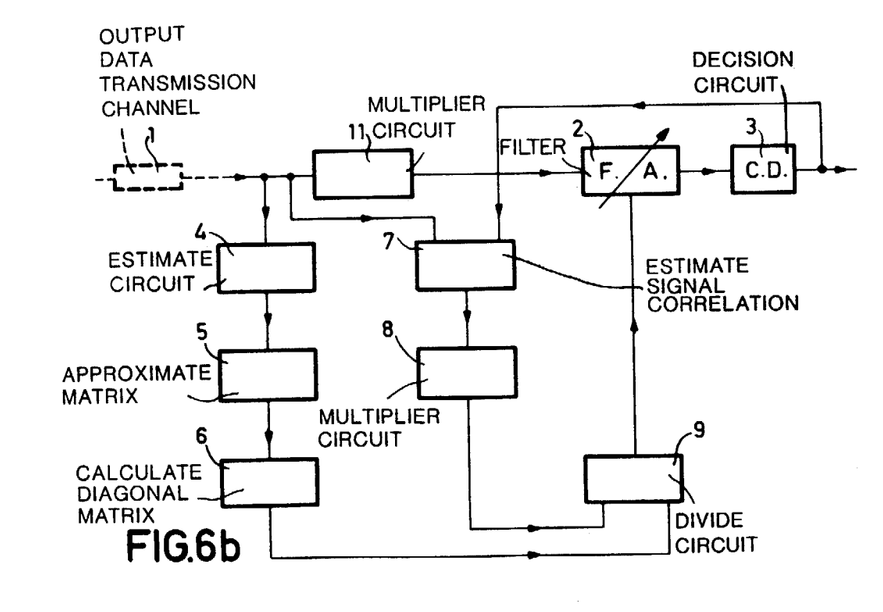

The receiving system shown in FIG. 6b therefore now comprises, in addition to the filter 2 and the circuit 3:

(A) the estimation circuit 4, the approximation circuit 5 and the calculation circuit 6: these three circuits have already been described with reference to FIG. 5.

(B) the circuit 11 for multiplying the output signal vector $X_k$ of the transmission channel by the unitary matrix P, which results in the signal vector $Z_k = P \cdot X_k$;

(C) the estimation circuit 7 for the vector $V^e$, the circuit 8 for multiplying $V^E$ by $P^{cc}$, and the "division" circuit 9, which have already been described with reference to FIG. 5, circuit 9 now being the circuit which, because of the fact that circuit 10 has been omitted, delivers an estimate of the vector which constitutes an approximation of the vector of the N weighting coefficients of the transversal filter 2 which ensure an optimum equalization of the transmission channel 1.

It must be understood that the present invention is not limited to the embodiments described in the foregoing and shown in the drawings, on the basis of which it is possible to provide alternative embodiments without departing from the scope of the invention.

It should be noted, for example, that for the event that the number N of the coefficients of the filter is equal to an integral power of 2, the Discrete Fourier Transform becomes a Fast Fourier Transform (for which reference is made particularly to the article "A guided tour of the Fast Fourier Transform," by G D Bergland, published in IEEE Spectrum, July 1969, pp 41 to 52), which is essentially characterized by a number of descrete elements in such manner that, for the embodiments described here, this results in a very significant reduction of the number of operations effected in the circuits for multiplication by P or by $P^{cc}$, and consequently in a considerable reduction of calculation time.

On the other hand, the clock circuit which fixes the value of the integer M defining the estimation interval of A and of V may be adjustable in order to have the value of M vary and to modify the compromise between the accuracy of the calculations and the repetition rate of these calculations.

What is claimed is:

1. In a digital data receiver, an adaptive system providing compensation for amplitude and phase distortions introduced by a data transmission channel and comprising an adaptive equalizing circuit receiving a signal vector $X_k$ from the data transmission channel output and producing an output signal $y_k$, and a decision circuit receiving this output signal $y_k$ and producing an estimation $\hat{s}_{k-d}$ of each one of the digital data $s_{k-d}$ applied to the data transmission channel input, characterized in that the adaptive equalizing circuit is a non-recursive transversal filter having N adjustable weighting coefficients and the adaptive system comprises for the direct determination of these coefficients.
a first circuit for determining, in an estimated matrix $A^e$ of the square signal autocorrelation matrix $A = E(X_k \cdot X_k^{TR})$ where E is the expectation operator and $X_k^{TR}$ is the transpose of $X_k$, the $(N/2+1)$ first elements $(a_0^e, a_1^e, a_2^e, \ldots a_{N/2}^e)$ of the first row if N is even, or the $(N+1)/2$ first elements $(a_0^e, a_1^e, a_2^e, \ldots a_{(N-1)/2}^e)$ of the first row if N is odd, over an interval equal to a predetermined number M of data symbol periods of duration T on the basis of the relation $$A^e = \frac{1}{M} \sum_{i=1}^{i=M} X_i \cdot X_i^{TR},$$

a second circuit connected to said first circuit for forming a vector $U=(r_0^e, r_1^e, r_2^e, \ldots r_{N-2}^e, r_{N-1}^e)$ in which $r_i^e = a_i^e$ for every i not exceeding N/2 if N is even, or not exceeding (N−1)/2 if N is odd, and $r_i^e = a_{N-i}^e$ for every i exceeding said limits, a third circuit connected to said second circuit for forming a vector $\Lambda^e = (\lambda_0^e, \lambda_1^e, \lambda_2^e, \ldots, \lambda_{N-1}^e)$, whose components are the eigenvalues of a circulant matrix having said vector U as a first row, with the aid of the relation $$\Lambda^e = \sqrt{N} \cdot P \cdot U^{TR}$$

where $U^{TR}$ is the transpose of U and P is the unitary matrix of the order N defined by $$P = ||P_{f,g}|| (f,g = 0, 1, 2, \ldots, N-2, N-1)$$

and $$P_{f,g} = \frac{1}{\sqrt{N}} \exp [j \, 2\pi \, f.g/N],$$

a fourth circuit connected to the data transmission channel output and the decision circuit output for determining an estimation $V^e$ of the signal correlation vector $V = E(X_k \hat{s}_{k-d})$ in accordance with the relation $$V^e = \frac{1}{M} \sum_{i=1}^{i=M} X_i \hat{s}_{i-d},$$

a fifth circuit connected to said fourth circuit for multiplying said estimated vector $V^e$ by the complex conjugate $P^{cc}$ of said unitary matrix P, a sixth circuit connected to said fifth and third circuits for dividing the vector $Q = P^{cc}.V^e$ at the output of said fifth circuit by said vector $\Lambda^e$ at the output of said third circuit on a term-by-term basis so that the resulting vector $F = (f_0, f_1, f_2, \ldots f_{N-1}) = Q/\Lambda^e$ has components $f_i = q_i/\lambda_i^e$ for every i not exceeding N−1, a seventh circuit connected to said sixth circuit for multiplying said vector F by said unitary matrix P, the resulting vector P.F is the estimate of the vector $C^R$ constituting an approximation of the vector of the N optimum weighting coefficients of said transversal filter and being applied to said transversal filter for adjusting the weighting coefficients.

2. An adaptive system as claimed in claim 1, characterized in that the system further comprises:

an eighth circuit connected to the data transmission channel output for multiplying said signal vector $X_k$ by said unitary matrix P, the resulting signal vector $Z_k = P.X_k$ being applied to said transversal filter input, a ninth circuit interconnecting said seventh circuit and said transversal filter for multiplying said vector P.F at the output of said seventh circuit by said matrix $P^{cc}$, the resulting vector being an estimate of $D^R = P^{cc}.C^R$ constituting an approximation of the N optimum weighting coefficients of said transversal filter when this filter receives said signal vector $Z_k$, and being applied to said filter for adjusting the weighting coefficients.

3. An adaptive system as claimed in claim 1 or claim 2, characterized in that it comprises means for adjusting the integer M to modify said estimation interval in said first and fourth circuits.

* * * * *